United States Patent [19]

Sakamoto

[11] Patent Number: 4,648,578
[45] Date of Patent: Mar. 10, 1987

[54] WEIGHT ADJUSTMENT DEVICE FOR A SEAT SUSPENSION

[75] Inventor: Takao Sakamoto, Kishima, Japan

[73] Assignee: Tachikawa Spring Co., Ltd., Tokyo, Japan

[21] Appl. No.: 773,886

[22] Filed: Sep. 9, 1985

[30] Foreign Application Priority Data

Sep. 28, 1984 [JP] Japan .................. 59-147169[U]

[51] Int. Cl.⁴ .......................................... F16M 13/00
[52] U.S. Cl. .................... 248/576; 248/396; 248/421; 248/422
[58] Field of Search ............... 248/394, 395, 397, 575, 248/372.1, 574, 422, 584, 421, 564, 566, 585, 576, 396

[56] References Cited

U.S. PATENT DOCUMENTS

| | | | |
|---|---|---|---|
| 2,161,367 | 6/1939 | McGregor | 248/394 |
| 2,795,267 | 6/1957 | Williams | 248/394 |
| 3,109,621 | 11/1963 | Simons | 248/575 |
| 3,473,776 | 10/1969 | Costin | 248/421 |
| 4,422,611 | 12/1983 | Kitsuda | 248/421 |
| 4,445,661 | 5/1984 | Langmesser | 248/394 |
| 4,520,986 | 6/1985 | Liljequist | 248/585 |
| 4,556,185 | 12/1985 | Takagi | 248/422 |

FOREIGN PATENT DOCUMENTS

| | | | |
|---|---|---|---|
| 7107 | 1/1980 | European Pat. Off. | 248/421 |
| 47910 | 10/1970 | Japan | 248/575 |

Primary Examiner—Reinaldo P. Machado
Assistant Examiner—Alvin Chin-Shue
Attorney, Agent, or Firm—Cushman, Darby & Cushman

[57] ABSTRACT

A weight adjustment device for a seat suspension to be provided in a seat for a vehicle such as an automobile is disclosed in which an upper frame and a lower frame are connected to each other by means of links, a rotary shaft is journalled between the two side portions of the lower frame and is provided at the two ends thereof with pinion gears integrally therewith, the pinion gears are intermeshed with sector gears freely rotatable in a vertical direction, and there are tension springs respectively extending between the respective first ends of the pinions gears and arms rotatable integrally with the links, whereby the sector gears are rotated by means of operation of an operation lever fixed to the rotary shaft to change the tensile forces of the tension springs so as to be able to adjust the height of the upper frame relative to the lower frame.

4 Claims, 5 Drawing Figures

WEIGHT ADJUSTMENT DEVICE FOR A SEAT SUSPENSION

BACKGROUND OF THE INVENTION

1. Field of the Invention

The present invention relates to a weight adjustment device suitable for use in a seat suspension for a vehicle such as an automobile.

2. Description of the Prior Art

Conventionally, many of seats for an automobile or the like are provided with a so-called seat suspension device which is adapted to support the seat resiliently so as to absorb the vibrations thereof, and, recently, a new type of seat suspension is proposed which is provided with a weight adjustment device for obtaining a predetermined seat support height at all times even when occupants of different weights are seated.

In FIG. 5, there is illustrated an example of the conventional seat suspension weight adjustment devices of this type. In FIG. 5, reference numeral (1) designates an upper frame and (2) represents a lower frame. The upper frame (1) and lower frame (2) are connected through two pairs of X-shaped links (3)(3) to each other in such a manner that they can be oscillated vertically.

Each of the X-shaped links (3), as is well known, comprises two link bodies (4) and (5) both of which are pivotally supported substantially at their central portions by a shaft (6) such that they are free to rotate. The rear-side (or front-side) upper end (5a) of each of the X-shaped links (3) is mounted to the upper frame (1) by another shaft (7) in a freely rotatable manner, while the lower end (4b) thereof is mounted to the lower frame (2) by another shaft (8) in a freely rotatable manner. Also, the front-side (or rear-side) lower end (5b) of each X-shaped link (3) is attached to the lower frame (2) by a roller (9) or the like such that it is free to slide, that is, it can be moved back and forth. The front-side upper ends (4a) of the respective X-shaped links (3) are connected with each other by means of a frame (10) extended therebetween, which serves to support the front portion of the upper frame (1) from below.

The rear-side upper ends (5a) of the two X-shaped links (3) are also connected with each other by means of another frame (11) to which the respective first ends of a pair of springs are secured.

A bell crank (14) is rotatably mounted via a pivot shaft (13) to the upper frame (1), with one end thereof bening engaged with an adjust shaft (15) extending laterally and the other end thereof being connected through a shaft (17) to one end of a tension frame (16) in a rotatable manner. This tension frame (16) is connected to an equalizer frame (18) in such a manner that it is rotatable about a shaft (19), and the second ends of a pair of springs (12) mentioned above are respectively secured to the two ends of the equalizer frame (18).

The above-mentioned adjust shaft (15), in this embodiment, is formed as a rotary shaft which is formed in a portion thereof with a screw slot (20). A nut (21) is threadedly engaged with this slot (20) and the above-mentioned one end of the bell crank (14) is engaged with this nut (21).

Also, substantially centrally of such conventional weight adjustment device, there is provided a shock absorber (22) with one end thereof being rotatably mounted to the rear-side side of the lower frame (2) and the other end thereof rotatably mounted to the frame (10).

In operation, if the adjust shaft (15) is rotatively operated to move the nut (21) back and forth, then the tensile force of the tension spring (12) can be varied through the bell crank (14) and tension frame (16), so that, even when the occupants of different weights are seated, the upper frame (1) can be adjusted such that it is always supported in a predetermined height level.

In the above-mentioned prior art arrangement, however, partly because a sufficient space is not available between a pair of springs (12) and partly because a screw mechanism including a screw and a nut block is employed as the adjustment mechanism thereof, when adjusting, for example, between 50 kg and 100 kg, the adjust shaft (15) must be rotated (manually) a considerable number of times, resulting in a very poor operationability. Also, the operation forces required for such adjustment become greater as the adjustment approaches toward 100 kg, and, actually, while the door of the car is closed, the adjustment operation is impossible.

Further, since the above adjustment mechanism is disposed on the upper frame (1) side, when a cushion body of the seat proper is directly mounted onto the upper surface of the upper frame (1), the cushion body interferes with the adjustment mechanism to produce a strange feeling at the sitting time. To avoid this, after another cushion frame is mounted onto the upper surface of the upper frame (1), the cushion body is then placed on the cushion frame. As a result of this, the prior art weight adjustment device is increased in weight and thickness and thus it is difficult to apply such prior art device to an ordinary automobile or the like which has a limited space.

SUMMARY OF THE INVENTION

The present invention aims at eliminating the drawbacks found in the above-mentioned weight adjustment device for a seat suspension provided in a vehicle seat.

Accordingly, it is a main object of the invention to provide an improved seat suspension weight adjustment device which is adjustable by a simple operation as well as is reduced in weight and thickness.

To attain this object, according to the invention, an upper frame and a lower frame of the seat suspension are connected to each other by means of a pair of right and left front links and a pair of right and left rear links in such a manner that the upper and lower frames are oscillatable in a vertical direction, a rotary shaft is journalled to the two sides of the lower frame and extending therebetween, two pinion gears are integrally mounted to the respective ends of the rotary shaft, two sector gears are so mounted to the lower frame as to be free to rotate vertically relative to the lower frame and are intermeshed with the pinion gears respectively, there are provided two tension springs each extending between a projection piece section extended from the pivotally mounted portion of each sector gear and the end of an arm rotatable integrally with the journalled portion of the front link on the lower frame side, and one end of the rotary shaft is connected to a locking device provided on the lower frame side.

In the above-mentioned structure of the invention, when a operation lever of the locking device is actuated to rotate the pinion gears integrally with the rotary shaft, then the sector gears intermeshed with the pinion gears are rotated to vary the tensile force of the tensile springs, thereby rotating the front links so as to be able to change the support height of the upper frame.

Accordingly, in the invention, since the support height of the upper frame can be changed by means of a small number of rotation of the operation lever, a high operationability can be obtained. Also, since the adjustment mechanism including the tension springs, sector gerars and the like is located on the lower frame side, there is produced a space in the central portion of the upper frame which can be used as a substitute for a flexible member of the cushion body.

The above and other objects and advantages of the invention will become apparent from the following description taken in connection with the accompanying drawings.

DETAILED DESCRIPTION OF A PREFERRED EMBODIMENT OF THE INVENTION

Figure 1:
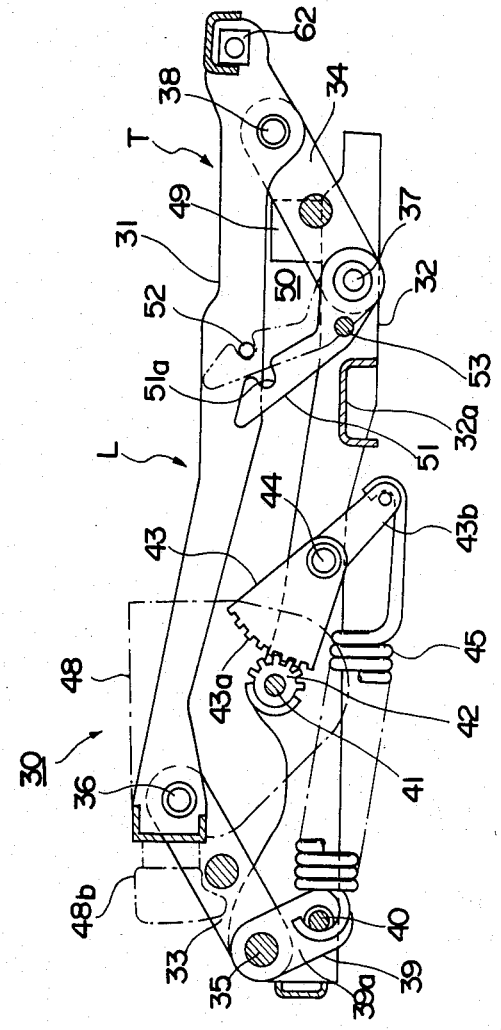
FIG. 1 is a longitudinal sectional side view of a seat suspension provided with a weight adjustment device of the invention.
Figure 2:
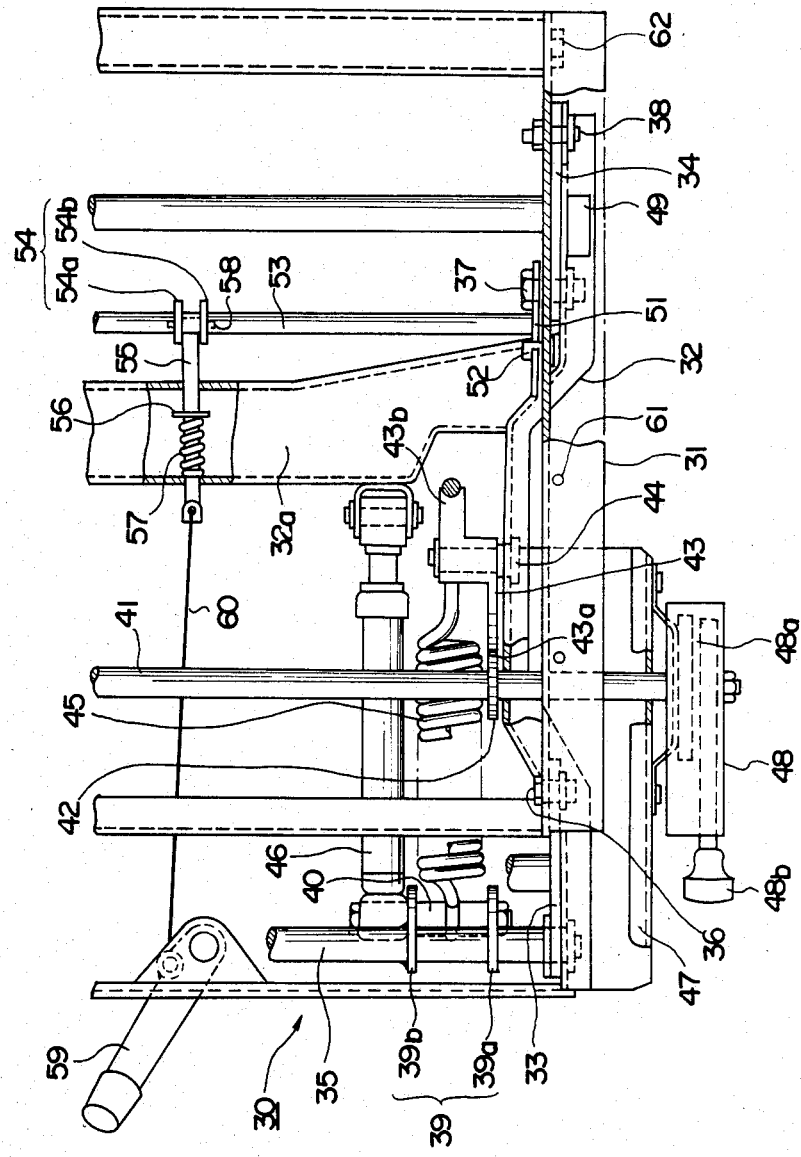
FIG. 2 is a partially cutaway plan view of a half section of the above seat suspension.
Figure 3:
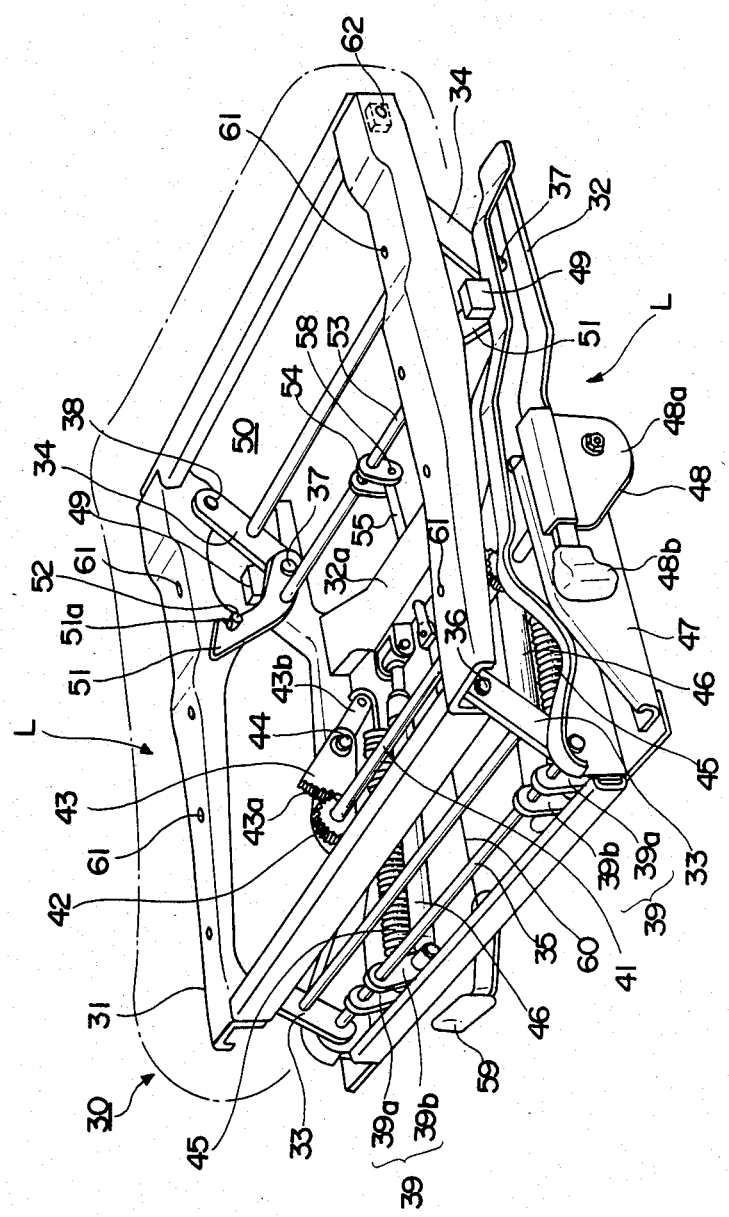
FIG. 3 is a perspective view of the above entire seat suspension.
Figure 4:
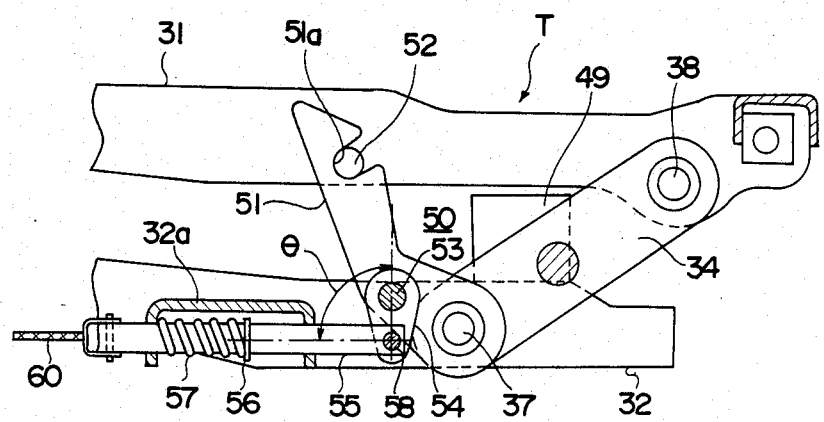
FIG. 4 is a longitudinal sectional side view of main portions of the above seat suspension; and, FIG. 5 is a perspective view of a conventional seat suspension weight adjustment device.
Figure 5:
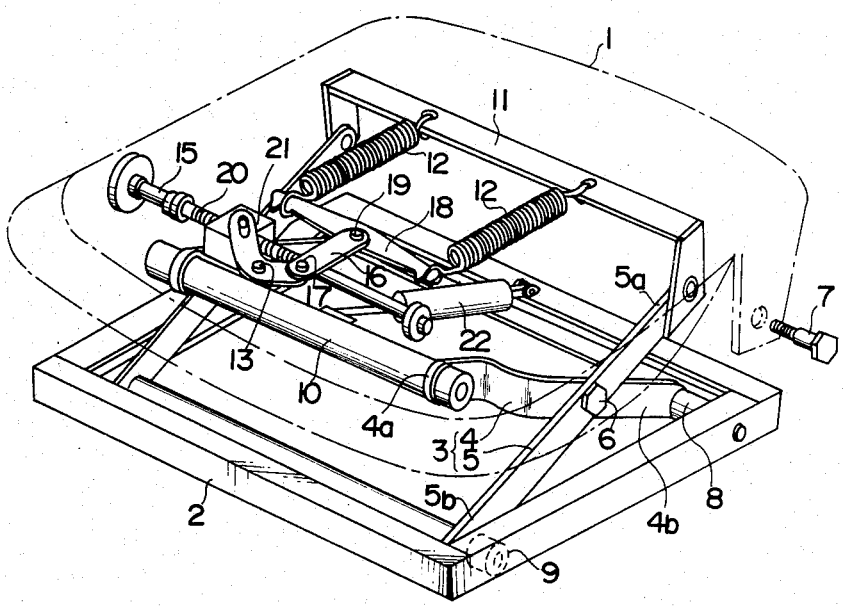

In the drawings, reference numeral (30) designates an entire seat suspension to which the invention is applied, (31) represents an upper frame of the seat suspension to which a seat body is mounted, and (32) stands for a lower frame to be fixed on the vehicle floor side. The upper frame (31) and lower frame (32) are connected with each other by means of a pair of front links (33)(33) and a pair of rear links (34)(34) which are disposed in the front and rear portions of the upper and lower frames, respectively. Specifically, a rod (35) is journalled between the respective front ends of the two side portions of the lower frame (32), and the front links (33)(33) are respectively fixed at their respective first ends to the two ends of this rod (35) with the second ends thereof being pivotally attached to the front ends of the two side portions of the upper frame (31) through shaft pins (36)(36) respectively. Also, the rear links (34)(34) are pivotally mounted at their first ends to the rear ends of the two side portions of the lower frame (32) and at their second ends to the rear ends of the two side portions of the upper frame (31) by means of shaft pins (37)(37) and (38)(38), respectively. In this structure, two parallel link mechanisms L, L are formed by the upper frame (31), front links (33), lower frame (32) and rear links (34), and thus the upper frame (31) can be changed in height relative to the lower frame (32) by means of the two parallel link mechanisms L, L respectively located on the two sides of the upper or lower frame, while maintaining it parallel relationship with respect to the lower frame (32).

Also, two arms (39)(39) are fixedly secured at the respective first ends thereof to the rod (35) adjacently to the front links (33)(33) respectively such that they extend rearwardly substantially at right angles to the front links (33)(33). Each of the arms (39)(39) comprises two opposed arm members (39a)(39b), between the second ends of which are journalled pins (40)(40) to which is secured one end of a tension spring to be described later.

Between the middle portions of the two side portions of the lower frame (32) there is journalled a rotary shaft (41), to the two ends of which pinion gears (42)(42) are integrally fitted.

Sector gears (43)(43) are vertically rotatably journalled by shaft pins (44)(44) to the two side portions of the lower frame (32) rearwardly of the journalled portion of the rotary shaft (41), with the respective gear surfaces (43a)(43a) being intermeshed with the pinion gears (42)(42).

The sector gears (43)(43) are respectively provided with projection pieces (43b)(43b) extending from their respective journalled portions to the lower frame (32) in a direction opposite to the gear surfaces (43a)(43a), and two tension springs (45)(45) are extended between the tip ends of the projection pieces (43b)(43b) and the pins (40)(40) in the arms (39)(39) mentioned above, respectively.

Two absorbers (46)(46) are respectively located parallel to the tension springs (45)(45). The respective front end thereof are connected to the extension ends of the pins (40)(40) journalled to the arms (39)(39) in such a manner that they are free to rotate vertically, while the respective rear ends thereof are connected to a frame (32a) extending across the middle portions of the two side portions of the lower frame (32) such that they are free to rotate vertically.

One side portion of the lower frame (32) is provided in the front portion thereof with a lower edge bent portion which is extended outwardly, and a bracket (47) is fixed to this extension perpendicularly thereto. A locking device (48) is rotatably mounted to the bracket (47), with one end of the rotary shaft (41) being connected to the locking device (48).

Although the locking device (48) is conventionally well known and will not be explained in detail, a locking device body (48a) thereof is provided with an operation lever (48b) which is free to retreat or appear. While the operation lever (48b) is retreating, the locking device body (48a) is locked relative to the bracket (47). When the operation lever (48b) is pulled out, then the locking device body (48a) is rotatable with respect to the bracket (47). In this condition, if the operation lever (48b) is rotatively operated, then the rotary shaft (41) is rotated together with the locking device body (48a).

Also, onto the rear upper surfaces of the two side portions of the lower frame (32) there are mounted rubber stoppers (49)(49), respectively, for absorbing shocks produced when the upper frame (31) is set at its lower-most position.

Further, there is provided a stopper mechanism (50) in the rear portion of the seat suspension (30).

In particularly, two stopper plates (51)(51) are journalled to the same shaft as with the rear links (34)(34) or coaxially therewith respectively at their respective lower ends, and also are provided in their respective upper rear edges with cutaway engagement portions (51a)(51a). Correspondingly to these engagement portions (51a)(51a), there are provided engagement pins (52)(52) in the middle portions of the two side portions of the upper frame (31), more particularly, on the inner surface side of the middle portions. Between the middle portions of the two stopper plates (51) (51) is journalled a rod (53), and link-piece means (54) [(54a)(54b)] is fitted at its one end to the central portion of the rod (53).

Also, correspondingly to the link-piece means (54), a shaft (55) is longitudinally slidably fitted into and supported by a support frame (32a) extending between the middle portions of the two side portions of the lower frame (32). The shaft (55) is normally biased backwardly by a spring (57) compressed and interposed between the front side surface of the support frame (32a) and a retaining ring (56), with the rear end of the shaft is being rotatably connected through a connecting pin (58) to the lower end of the above-mentioned link-piece means (54).

The shaft (55) and link-piece means (54) are connected with each other in such a manner that, while the stopper plates (51)(51) are respectively engaged with the engagement pins (52)(52), the connection angle of the link-piece means (54) to the shaft (55), $\theta$, is 90 deg., that is, the rod (53) and the connecting pin (58) are opposed perpendicularly to each other.

The front end of the shaft (55) is connected via a wire (60) to an operation lever (59) mounted onto the front portion of the lower frame (32), whereby, if the operation lever (59) is rotatively operated, then the shaft (55) is slided longitudinally and thus the stopper plates (51)(51) being connected therewith are also rotated longitudinally.

In the respective upper surfaces of the two side portions of the upper frame (31), there are formed a plurality of suitably spaced through-bores (61) for securing a spring for receiving a pad, while to the respective rear ends of the two side portions thereof are fixed nuts (62)(62) for mounting a reclining device of a seat back.

In the seat suspension weight adjustment device constructed in the above-mentioned manner, when the occupant is seated, the upper frame (31) is depressed by the load of the occupant and the occupant can be supported with a suitable resiliency by means of the tension springs (45)(45) and absorbers (46)(46). During this condition, the respective engagement portions (51a)(51a) of the stopper plates (51)(51) of the stopper mechanism (50) are separated from the associated engagement pins (52)(52).

In this sitting status, the amounts of displacement of the upper frame (31) are caused to vary due to the occasional loads of the occupant weight. In order to support the occupant always at a predetermined height in such circumstances, the sector gears (43)(43) are respectively rotated via the associated pinion gears (42)(42) by means of the rise-fall rotative operation of the operation lever (48b) to vary the tensile forces of the tension springs (45)(45) respectively secured at the rear ends thereof to the projection pieces (43b)(43b) of the sector gears (43) (43). As a result of this, the front links (33)(33), to which the front ends of the tension springs (45)(45) are secured respectively, are rotated in a rise-fall manner about the respective journalled portions thereof on the lower frame side so as to move the upper frame (31) up or down relative to the lower frame (32).

In other words, for example, when an occupant of heavy weight is seated, the tension springs (45)(45) and absorbers (46)(46) are pulled to a great extent due to the heavy loads and thus the upper frame (31) is set at a lower position than usual. Accordingly, in this sitting condition, the operation lever (48b) should be drawn out of the locking device body (48a) and be rotated while it is being lifted upwardly to pull the tension springs (45)(45) rearwardly and strongly so as to raise the upper frame (31) up to its usual support height against the heavy weight of the occupant.

On the contrary, when an occupant of light weight is seated, the upper frame (31) is set at a higher position than usual. Accordingly, in such sitting condition, the operation lever (48b) should be rotated while depressing it to weaken the tensile forces of the tension springs (45)(45) so as to lower the upper frame (31) down to its usual support height.

In this way, by operating the operation lever (48b) of the locking device (48) in a rotative manner according to the weights of the occupants, the upper frame (31) can be supported always in a predetermined height for any occupants of variable weights.

In order to stop the suspension function of the present weight adjustment device, the upper frame (31) is first set at the predetermined support height to cause the engagement pins (52)(52) to correspond to the engagement portions (51a) (51a) of the stopper plates (51)(51), and thereafter, if the operation lever (59) is operated to rotate the stopper plates (51)(51) through the shaft (55) and thus to bring the engagement portions (51a)(51a) thereof into engagement with the engagement pins (62)(62) respectively, then the upper frame (31) is locked to be immovable vertically relative to the lower frame (32) and thus the resilient support by the tension springs (45)(45) and absorbers (46)(46) is caused to stop.

In such locked status, since two truss structures T, T are formed respectively by the stopper plates (51), rear links (34) and the respective rear portions of the two side portions of the upper frame (31), the upper frame (31) can be locked more securely relative to the lower frame (32) to increase the rigidity fo the entire seat suspension, so that there is eliminated the possibility of such locking of the upper frame (31) relative to the lower frame (32) being removed unexpectedly even when strong vibrations or great loads are applied to the upper frame (31).

Also, in such locked condition, since the connection angle of the link-piece means (54) with the shaft (55) is 90 deg., namely, the rod (53) and connecting pin (58) are set to be opposed to each other perpendicularly, even when excessing loads are given to the upper frame (31) to produce such forces as remove the stopper plates (51)(51) via the engagement pins (52)(52), such forces are applied via the link-piece means (54) to the connecting pin (58) of the shaft (55) perpendicularly and thus the engagement of the stopper plates (51)(51) with the associated engagement pins (52)(52) is maintained, so that there is no possibility of such locking being removed easily.

As can be seen from the foregoing description, according to the seat suspension weight adjustment device of the invention, since the adjustment mechanism thereof is composed of the pinion gears (42) and sector gears (43), great amounts of displacement of the upper frame (31) can be obtained by small amounts of operation of the operation lever (48b), and also since such adjustment mechanism and the like are all disposed on the lower frame (32) side, there is produced a space centrally of the upper frame (31), so that, even when a cushion body is attached direct to the upper frame (31), there is no possibility of the cushion body interfering the adjustment mechanism. In other words, since there is no need to provide a cushion frame separately on the upper frame (31) as in the conventional devices, the invention has an advantage that the entire seat can be reduced in weight and thickness.

Although in the illustrated embodiment there are provided the arms (39)(39) rotatable integrally with the front links (33)(33) and there are provided the tension springs (45)(45) extending between these arms (39)(39) and the projection pieces of the sector gears (43)(43), the invention is not limited to this, but, for example, the tension springs (45)(45) may be extended between the respective central portions of the sector gears (43)(43) and the rear links (34)(34).

As described hereinbefore, according to the seat suspension weight adjustment device of the invention, since a gear mechanism composed of pinion gears and sector gears is employed as the adjustment mechanism thereof, a sufficient amount of adjustment can be obtained by a small amount of rotational operation of an operation lever provided in the locking device thereof, which results in an excellent operationability. Also, all components of the adjustment mechanism such as the tension springs, sector gears and the like are disposed on the lower frame side to produce space in the central portion of an upper frame, which space can be used as a substitute for a cushion body. This means that the upper frame can be directly used as a cushion frame. Therefore, according to the invention, the entire seat can be reduced in weight and thickness, which is greatly effective when applied to a vehicle of limited space, especially an automobile.

What is claimed is:

1. A weight adjustment device for a seat suspension comprising:
    a lower frame mounted on a floor side of a vehicle, said lower frame including first and second lateral bar sections;
    an upper frame mounted on a seat side of said vehicle so as to be vertically movable relative to said lower frame;
    a pair of front links, each being pivotally coupled at one end portion thereof to a forward portion of said upper frame;
    a pair of rear links, each being pivotally coupled at one end portion thereof to a rear portion of said upper frame and being pivotally coupled at the other end portion thereof to a rear portion of said lower frame;
    a rotary shaft journalled between said first and second lateral bar sections of said lower frame, each end of said rotary shaft having a pinion gear fixedly coupled thereto;
    a pair of sector gears, each being pivotally coupled to one of said first and second lateral bar sections, respectively, so as to be vertically rotatable, each of said sector gears including a gear surface and being fixedly coupled to one end of a projection piece, each said projection piece extending from said sector gear in a direction opposite to a facing direction of each said gear surface, each said sector gear being engaged with one of said pinion gears, respectively, at said gear surface;
    an operation lever fixedly coupled to said rotary shaft;
    a rod rotatably journalled between said first and second lateral bar sections of said lower frame, each of said front links being fixedly coupled at the other end portion thereof to each end portion of said rod, respectively;
    first and second arms, each arm including at least one arm member, each of said arms being fixedly coupled at one end thereof to said rod, adjacent to each of said front links, respectively, the other end of each of said arms extending downwardly relative to said rod; and
    a pair of tension springs, each being extended between one of said other ends of said arms and one of said projection pieces, respectively, so as to bias said upper frmae upwardly relative to said lower frame,
    whereby operation of said operation lever causes rotation of said rotary shaft and simultaneous rotation of said pinion gears, thereby rotating said sector gears and thus varying the tensile forces of said tension springs so as to adjust the height of said upper frame relative to said lower frame.

2. The weight adjustment device for a seat suspension according to claim 1, wherein said arms are disposed so as to be substantially perpendicular to said front links; and said upper frame, said front links, said rear links, and said first and second lateral bar sections cooperate so as to form two parallel link mechanisms.

3. The weight adjustment device for a seat suspension according to claim 1, wherein said first and second arms include first and second pin means, respectively, and further comprising:
    a frame member coupled at each end thereof to said first and second lateral bar sections, respectively; and
    a pair of means for absorbing shock, each being pivotally coupled at one end thereof to said first and second pin means, respectively, and being pivotally coupled at the other end thereof to said frame member.

4. The weight adjustment device for a seat suspension according to claim 1, wherein each said projection piece has a length that is greater than a length of each said section gear.

* * * * *